US012576352B2

(12) United States Patent　　　　(10) Patent No.:　US 12,576,352 B2
Azpiazu　　　　　　　　　　　　　　　　(45) Date of Patent:　　Mar. 17, 2026

(54) SYSTEM AND METHOD FOR FLUID FILTRATION

(71) Applicant: Aurelio Azpiazu, Port Republic, MD (US)

(72) Inventor: Aurelio Azpiazu, Port Republic, MD (US)

( * ) Notice: Subject to any disclaimer, the term of this patent is extended or adjusted under 35 U.S.C. 154(b) by 309 days.

(21) Appl. No.: 18/225,266

(22) Filed: Jul. 24, 2023

(65) Prior Publication Data

US 2023/0364538 A1　　Nov. 16, 2023

Related U.S. Application Data

(63) Continuation-in-part of application No. 17/289,812, filed on Apr. 29, 2021, now Pat. No. 12,011,681.

(51) Int. Cl.
B01D 39/10　　　　　(2006.01)

(52) U.S. Cl.
CPC ...... B01D 39/10 (2013.01); *B01D 2201/0461* (2013.01); *B01D 2201/08* (2013.01); *B01D 2201/12* (2013.01)

(58) Field of Classification Search
CPC ............ B01D 39/10; B01D 2201/0461; B01D 2201/08; B01D 2201/12; B01D 29/21; B01D 29/58
See application file for complete search history.

(56) References Cited

U.S. PATENT DOCUMENTS

| | | | | |
|---|---|---|---|---|
| 4,436,536 | A | * | 3/1984 | Robinson ............. B01D 46/521 |
| | | | | 55/498 |
| 4,687,579 | A | | 8/1987 | Bergman |
| 4,832,836 | A | | 5/1989 | Selsdon |
| 5,102,542 | A | | 4/1992 | Lawrence et al. |
| 5,126,043 | A | | 6/1992 | Giordano et al. |
| 5,536,290 | A | * | 7/1996 | Stark ................... B01D 46/2414 |
| | | | | 55/498 |

(Continued)

FOREIGN PATENT DOCUMENTS

JP　　　　　H07323217 A　　　12/1995

OTHER PUBLICATIONS

PCT International Search Report and Written Opinion mailed Jan. 16, 2020 in counterpart PCT application PCT/US2019/058603, 8 pages.

(Continued)

*Primary Examiner* — Waqaas Ali
(74) *Attorney, Agent, or Firm* — Juan Carlos A. Marquez; Marquez IP Law Office, PLLC

(57)　　　　　ABSTRACT

A filter device provides designs that permit variable levels of solid particle removal. The filter device retains the particles in the filter medium when removed, thus avoiding the re-entry of the particles when the power system has cooled down which occurs in conventional filters currently in use. The filter device incorporates elements made from stainless steel for (a) durability and high mechanical strength to endure high continuous flow pressures; (b) ductility so as to be pleated and shaped into a cylinder; (c) corrosion and high temperature resistance; (d) particulate removal in the range of 4-20 microns depending on the desired performance characteristics; (e) high percentage of contaminant removal; and (f) recyclability and reusability.

16 Claims, 13 Drawing Sheets

(56)          References Cited

U.S. PATENT DOCUMENTS

| | | | | |
|---|---|---|---|---|
| 5,705,071 | A * | 1/1998 | Morris | .................. B01D 29/07 |
| | | | | 210/493.1 |
| 6,200,367 | B1 | 3/2001 | Phillips | |
| 6,391,193 | B1 | 5/2002 | Luka | |
| 6,406,625 | B1 | 6/2002 | Brock et al. | |
| 7,597,202 | B1 * | 10/2009 | Tidwell | ............... B01D 35/147 |
| | | | | 210/429 |
| 2002/0179521 | A1 * | 12/2002 | Paul | ...................... B01D 65/00 |
| | | | | 210/485 |
| 2006/0278569 | A1 | 12/2006 | Meddock et al. | |
| 2008/0093014 | A1 | 4/2008 | Choi | |
| 2010/0078377 | A1 | 4/2010 | Google et al. | |
| 2010/0170208 | A1 | 7/2010 | Matula et al. | |
| 2012/0211408 | A1 * | 8/2012 | Hopkins | ............ B01D 46/2411 |
| | | | | 210/232 |
| 2013/0264273 | A1 * | 10/2013 | Denton | .................. B01D 59/30 |
| | | | | 210/489 |
| 2021/0394092 | A1 | 12/2021 | Azpiazu | |
| 2023/0364538 | A1 | 11/2023 | Azpiazu | |

OTHER PUBLICATIONS

PCT International Search Report mailed Dec. 4, 2024 in counterpart PCT application PCT/US2024/039420, 85 pages.
PCT Written Opinion mailed Dec. 4, 2024 in counterpart PCT application PCT/US2024/039420, 12 pages.

* cited by examiner

26

SYSTEM AND METHOD FOR FLUID FILTRATION

The present application is a continuation-in-part of and claims the benefit of domestic priority to U.S. patent application Ser. No. 17/289,812 filed on 29 Apr. 2021, the disclosure of which is hereby incorporated by reference in its entirety.

BACKGROUND OF THE INVENTION

1. Scope of the Invention

The present invention is directed to a system and method for filtering viscous fluids, such as motor oil, so as to improve the useful life of the fluid. In particular, the present invention filters particulates from the fluid using a novel combination of elements that maximize the filtration of particulates, while preserving performance of the engine, motor or other device utilizing the present invention and at the same time allowing prolonged usage of the engine, motor or other device before requiring replacement or maintenance thereof. In addition, the present invention can avoid the build-up of water during the filtration process, which can degrade performance. This results in a viscous fluid that is free from contaminants for longer periods of operation and usage.

2. State of the Prior Art

The use and processing of oil, fuel and other lubricants or fluids used in mechanical systems suffers from a lack of adequate filtration to remove contaminants and excess water. While ultra-filtration processes exist for such extreme requirements as in medical research and similar products, the same levels of filtration level have not been possible to include within existing mechanical systems. For purposes of discussion only, the main focus of the invention to be disclosed hereinafter will focus on automotive or engine lubrication. That said, nothing described is limited to only that application.

Even the best oil, regardless of traditional motor oil or the much improved synthetic blends, will over the time of its usage will accumulate solid contaminants (i.e., particles or particulates). In some instances, even the best oil will contain some solid contaminants even before it is used as a result of the processes used to manufacture or package the oil. For purposes of the discussion herein, "particles" and "particulates" will mean small solids that can best be seen with a microscope. These particles range from less than one micron (very small) to 10 microns and some larger ones as well. In addition, traditional motor oils and synthetic blends tend to contain some water particles, which will be referred to hereinafter as "native water." "Native water" will mean moisture or water molecules that either exist in the oil from its natural source and/or as a result of the refining and processing required.

The presence of contaminants and water combine to damage the equipment (in most cases a motor) which the oil seeks to lubricate. As the contaminant particles are usually metal, they are subject to rusting. In other cases, the particles act as abrasives that wear on the surfaces the oil seeks to lubricate. The combination of contaminants and water present in the oil is thus not conducive to the motor's performance or to the useful life of the motor.

Oil filters currently available are surprisingly similar to those manufactured and used as early as the 1950s. Current oil filters do not remove significant amounts of the solid abrasive contaminants, are unable to remove very small particles (less than 10 microns), are unable to remove native water and are unable to "hold" these solid contaminants and native water. In most cases, a conventional filter is a simple paper or cellulose, or even fiberglass filter that is placed in various configurations in the engine's oil flow and seeks to trap the solid contaminants. Typically, such filters capture particles larger than 40 microns and little to none of the water. Even more, when the engine (gas or diesel) is "restarted" after cooling, conventional oil filters release all of the liquid and solid contaminants back into the oil and into the engine's system.

Some users install additional systems that have to be installed externally at higher cost with modifications to the engine or system. These additional systems and modifications are often restricted to larger prime movers and only if the vehicle in which it is installed has adequate space to accommodate the change.

A few, more advanced and expensive filters, try to improve the structure of conventional filters by having two different "thicknesses of filter" material to pass the fluid through both and try to remove smaller particles. However, these supposedly more advanced filters initially filter out more particles, but cannot hold the particles when the engine and filter cool down. Thus, the particles collected by these more advanced filters simply fall out and re-enter the flow of the oil when the engine is activated again. In the case of fiberglass filters, these types of filters have been known to release fiberglass strands into the fluid adding to the contaminants that are already present.

In addition, all previous conventional designs as described above cannot effectively filter out and hold the water that is already present in the fluids being filtered (i.e., "native water"), and thus cannot output a fluid that is truly contaminant-free (e.g., free of solid and liquid contaminants). Another factor in filter designs is cost-in order to achieve the improved quality of filtration there is a cost factor that any new design must consider.

The structure and operation of the present invention disclosed and claimed hereinbelow considers and overcomes the above-mentioned limitations in the prior art.

SUMMARY AND ADVANTAGES OF THE INVENTION

The present invention incorporates the use of metal fiber filtration media which can remove particles as small as 4 microns in size, and in some embodiments as small as 2 microns. This metal fiber filtration media effectively eliminates the majority of the contaminant particles. This new filtration media, in most instances, will typically allow near full flow, which will permit the entire volume/capacity of the oil sump to be filtered approximately every 10 minutes of continuous operation, depending on variances due to engine type and volume of oil. This results in the effective cleaning of the oil and the removal of any additional contaminants that are a result of normal operations on a continuous basis.

Some embodiments of the invention has been shown to remove and hold particulate contamination down to as small as 10 microns, while meeting and/or exceeding current OEM standards for filter replacement intervals. Further embodiments have been shown to remove and hold particulate contamination down to 4 microns while also providing longer filter replacement intervals pursuant to current OEM requirements (for example, up to 100,000 miles for the military grade standards). Even further, embodiments have been shown to remove and hold native water while still achieving the performance characteristics and advantages as noted above.

In some embodiments, when combined with water absorbing natural fiber filtration media, this forms a complementary filtration material that will be not only contain the solid particles, but also trap and hold native water, preventing the water from joining the smaller particles and becoming the basis of wear in both new and the older filter and engine designs.

Features and advantages of the present invention include engine operating expenses in commercial applications being conservatively estimated to be reduced by up to 75% because of significant extensions in the periods between required replacements, reduced environmental impact of disposing/reprocessing of used oil and lowered engine emissions, and more effective removal and retention of liquid and particulate contamination extending engine life by up to 50%.

DESCRIPTION OF THE DRAWINGS

The present invention is illustrated in the accompanying drawings, wherein.

DETAILED DESCRIPTION OF THE PREFERRED EMBODIMENTS

The present invention as will be described below has numerous advantages. A filter device implemented according to the invention provides for designs that permit variable levels of solid particles. A filter device according to the invention not only removes the particles from the fluid, but also retains those particles in the filter medium when removed thus avoiding the re-entry of the particles when the power system has cooled down and restarts.

The present invention embodies a design that eliminates at least three conventional pieces currently used in manufacturing the end use applications of the improved mediums. In addition, it embodies a novel application of different filtering mediums than are now in use in other available production products. Even more, the present invention provides for lower overall costs to the end user as minor production costs increases are compensated in lower operating and maintenance costs as well as increased operational time, cleaner emissions and less use of resources. The design of the present invention also permits end products that are easily replaced in the existing access ports in any prime mover for which it may be produced, as well as recyclable with little or no waste of its components.

The implementation of at least a first embodiment of the present invention includes two different filter media. The first filter media consists of a sintered stainless steel or other similar medium that can be produced in particle trapping sizes in the range of 4-20 microns. A commercially available version of such a stainless steel media is designed and produced as well as separately patented by BEKAERT Filtration for medical and other applications.

The second media consists of a long-fiber filtering media designed to separate particles as small as 8-10 microns. The long-fiber, media would be designed with properties for holding and retaining "native water" or moisture introduced to the lubrication system. Commercially available media are currently in production for other non-lubrication applications. The long-fiber material may be selected from, for example, any non-cellulose materials known in the art that are capable of performing this function, or from proprietary materials specially designed for this purpose and for surviving in the environment in which conventional oil filters, fuel filters and the like are used. Such long-fiber media can provide improved removal of the contaminants described above. Among the main advantages of the present invention, neither medium described above releases the solids trapped in them in the filter device when the engine and fluids cool down and then are restarted.

Figure 1:
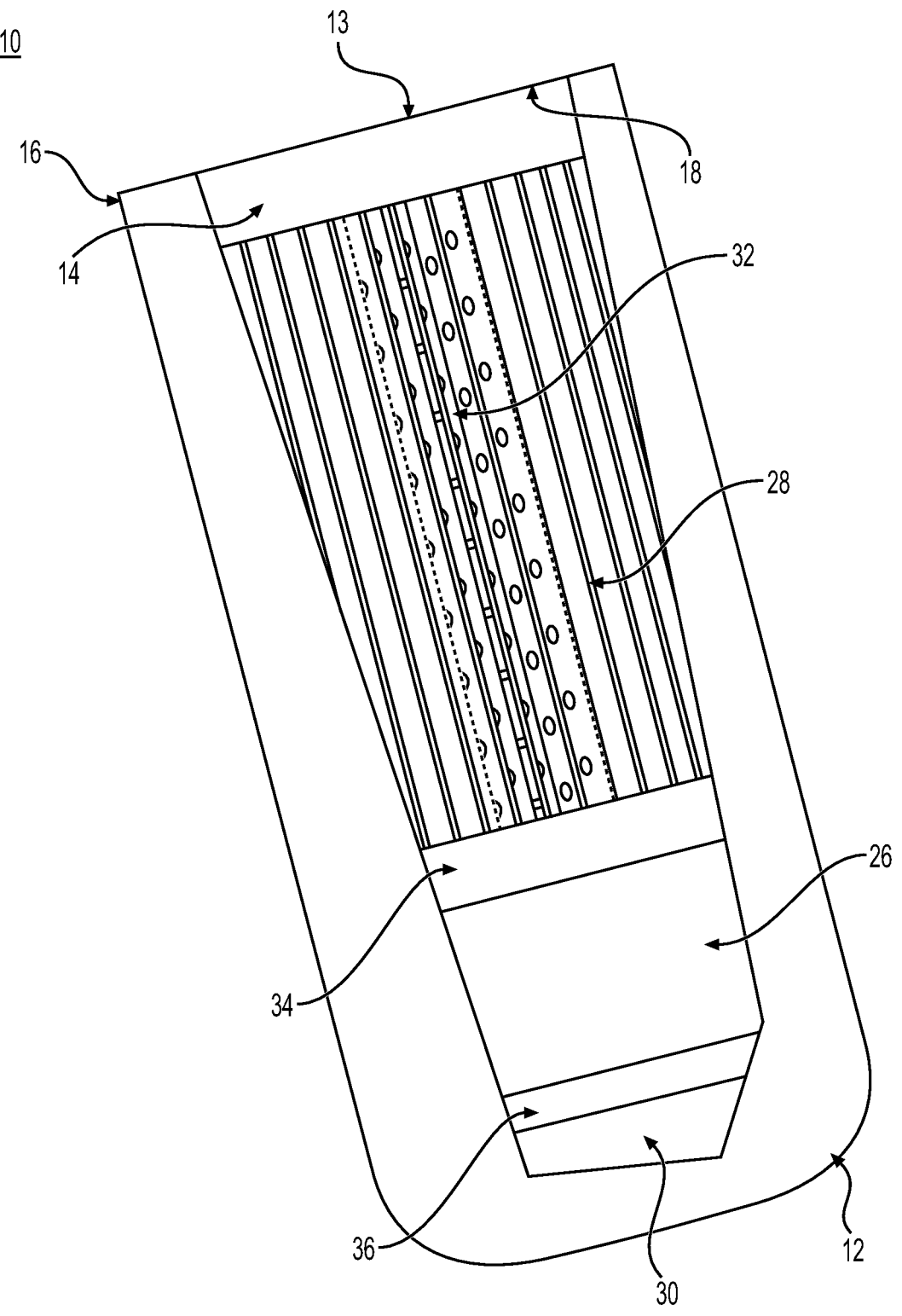
FIG. 1 shows an overall view in partial cross-section of at least one embodiment of the filter device according to the present invention.
Figure 2:
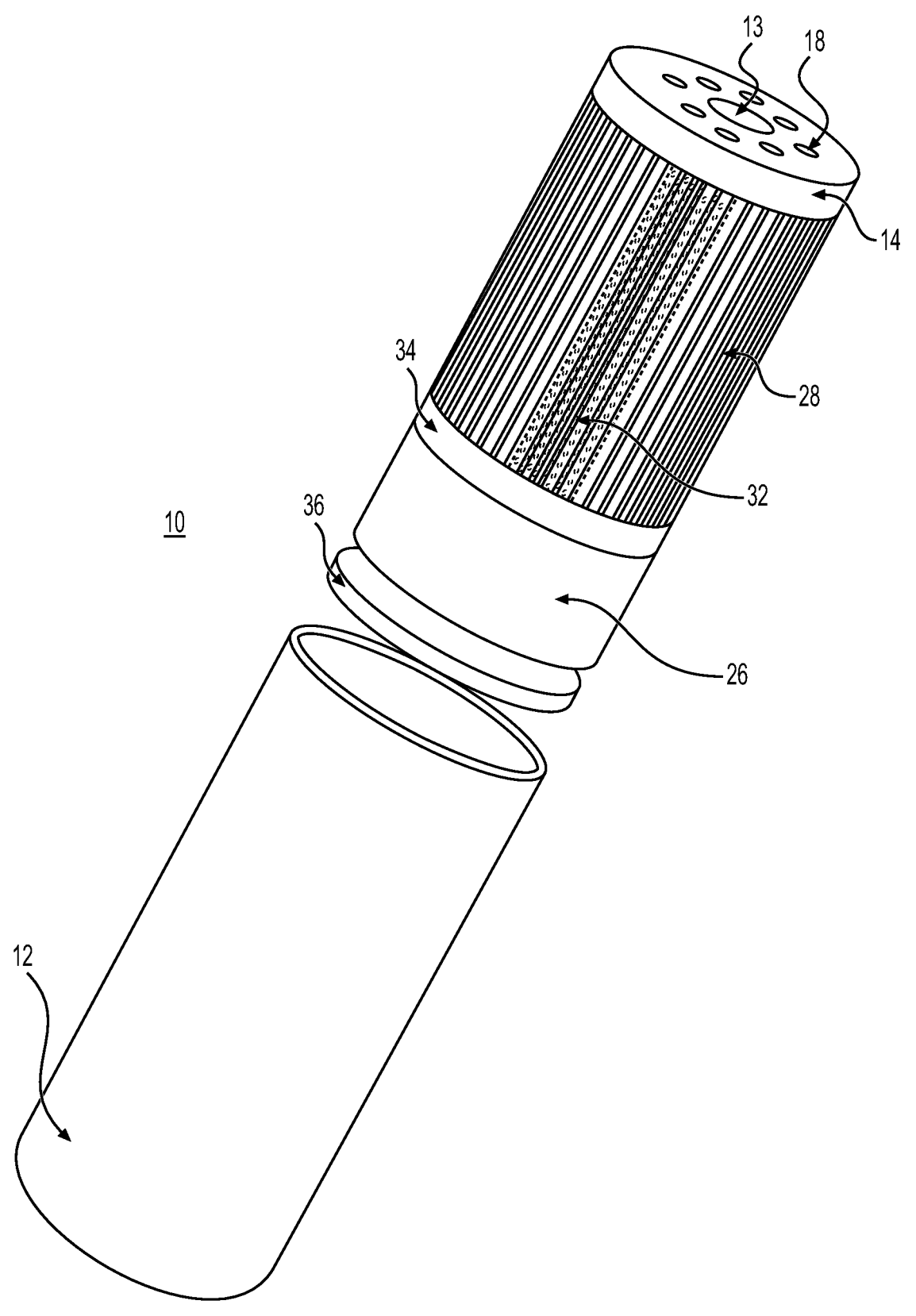
FIG. 2 shows an exploded view of the at least one embodiment of the filter device according to the present invention.

In an exemplary embodiment or implementation of the filter device according to the present invention, as shown in FIG. 1 (cross-section view) and FIG. 2 (exploded view), the filter device 10 comprises a substantially cylindrical filter bowl or body 12 which acts to encase the internal parts of the filter device 10. The body 12 of the filter device 10 comprises a front face plate adaptor 14 forming a substantially circular cover for the front end of the filter device 10. The front face plate adaptor 14 is formed so as to enable it to connect to an input port for the oil or fuel and to receive an annular seal 16 along an outer periphery of the front face plate adaptor 14. It is preferred that the size, shape and configuration of the front face plate adaptor 14 and seal 16 is such that the filter device 10 is connectable with a conventional filter connection port for either an oil and/or fuel reservoir system.

The front face plate adaptor 14 comprises an inlet port 18 which includes at least one aperture formed on a peripheral surface 14a of the front face plate adaptor 14 that allows the flow of oil or fuel into the body 12 of the filter device 10. The inlet port 18 opens into the peripheral space 12a inside the body 12. The front face plate adaptor 14 also incorporates a central outlet port 20 from which the oil or fluid that has passed through the filter device 10 exits and flows back to the engine or oil/fuel reservoir system.

Inside the body 12 of the filter device 10, a first high flow filter media 28 and a second water removal filter media 26 are positioned immediately adjacent one another such that when the oil or fluid inputted into the filter device 10 via the inlet port 18 flows first into the first high flow filter media 28 and then into the second water removal filter media 26.

Figure 3:
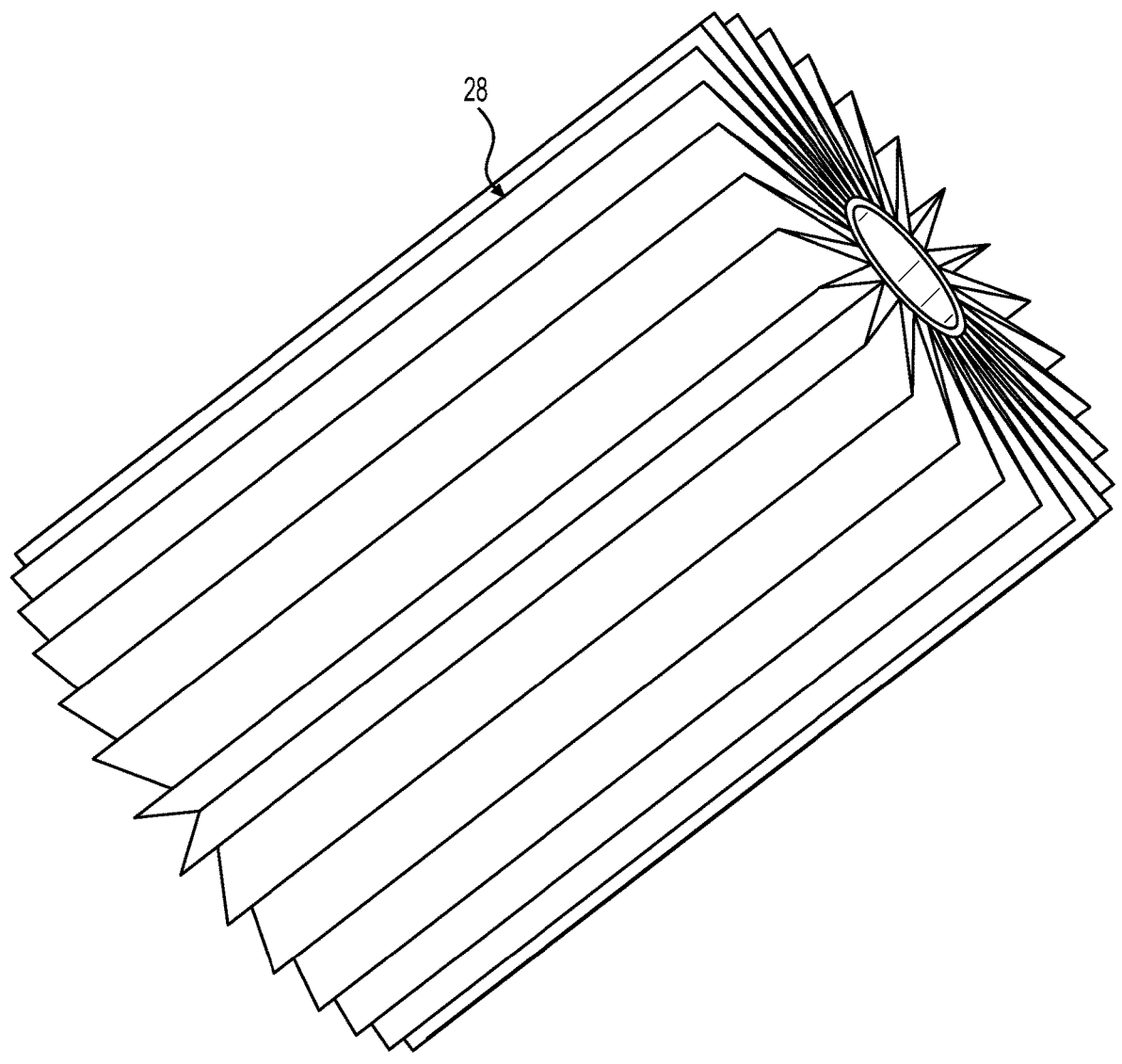
FIG. 3 shows at least one embodiment of the first filter media in the filter device according to the present invention.

As shown in FIG. 3, the first high flow filter media 28 made from perforated sintered stainless steel or other similar material is formed as a pleated cylinder 28*a* with a hollow tubular center 28*b*. Specifically, in at least one embodiment, the filer media 28 is formed from sheet filter material made of sintered stainless steel. The sheet filter material is pleated to form the cylinder 28*a* with the pleated sheet filter material forming an inner wall 28*c* surrounding the hollow tubular center 28*b*. In its preferred embodiments, the sheet filter material may be formed from sintered stainless steel. Otherwise, the sheet filter material may be formed using any other material capable of: (a) durability and high mechanical strength to endure continuous flow pressures of 120 psi or higher; (b) ductility so as to be pleated and shaped into a cylinder; (c) corrosion and high temperature resistance (i.e., 200-260 degrees Fahrenheit (93-127 degrees Celsius or higher, which is the typical temperature of motor oil in an internal combustion engine); (d) particulate removal in the range of 4-20 microns depending on the desired performance characteristics; (e) high percentage of contaminant removal (i.e., 80 percent or higher); and (f) recyclability and reusability when recovered so as to avoid landfill or other potentially toxic disposal. Also in the preferred embodiments, the sheet filter material is pleated in a triangular wave-like shape. However, other embodiments for the pleating of the sheet filter material include sine wave-like, flower petal wave-like, square wave-like and sawtooth wave-like shapes (all not shown).

Alternatively, the sheet filter material may be made from other materials, including but not limited to other metals, ceramics, carbon fibers, plastics or combinations thereof, that exhibit the same or similar characteristics as those mentioned above. Further, those alternative materials may be formed using other processes known to achieve the same or similar characteristics, including but not limited to sintering, weaving strands or fibers into a mesh, and perforating. In tests performed to determine the optimum performance characteristics of the sheet filter material, the optimum sheet filter materials have (a) durability and high mechanical strength to endure continuous flow pressures in the range of 120 psi or higher; (b) ductility so as to be able to form 0.25-0.8125 inch pleats while still being formable into a cylindrical shape having an outer diameter in the range of 3.5 inches and higher, and an inner diameter in the range of 1.0-2.0 inches or more; (c) corrosion and high temperature resistance (i.e., in the range 200-260 degrees Fahrenheit or higher); (d) porosity to remove particulates in the range of 4-20 microns in size; and (e) contaminant removal percentage in the range of 80 percent or higher. For the width of the individual pleats, using the dimensions of the filter element in a conventional automotive engine oil filter as an example, an outer diameter in the range of 3.5 inches and higher, and an inner diameter in the range of 1.0-2.0 inches would allow the width of the pleats to be in the range of 0.75 inch and higher, though different widths (both larger and smaller) may be possible depending on the specific application and performance requirements.

In tests performed to select the sheet filter material, sintered stainless steel was determined to meet or exceed the above-noted capabilities. In terms of filtering porosity, the sheet filter material was selected to be able to remove particulates as small as 4 microns. However, tests have shown that the filter device 10 constructed with the pleated cylinder 28*a* using sintered stainless steel sheet filter material with porosities as high 8-10 microns have effectively trapped particulates as small as 4 microns. However, depending on the practical requirements of desired performance characteristics of the filter device, the effective porosity of the sintered stainless steel sheet filter material has been determined to be in the range of 0 to 20 microns. As such, the combination of at least selecting the material for the sheet filtering material and the pleating of the sheet filtering material achieves, among other advantages, the ability of effectively filtering particulates beyond the rated porosity of the selected filtering material.

Figure 4:
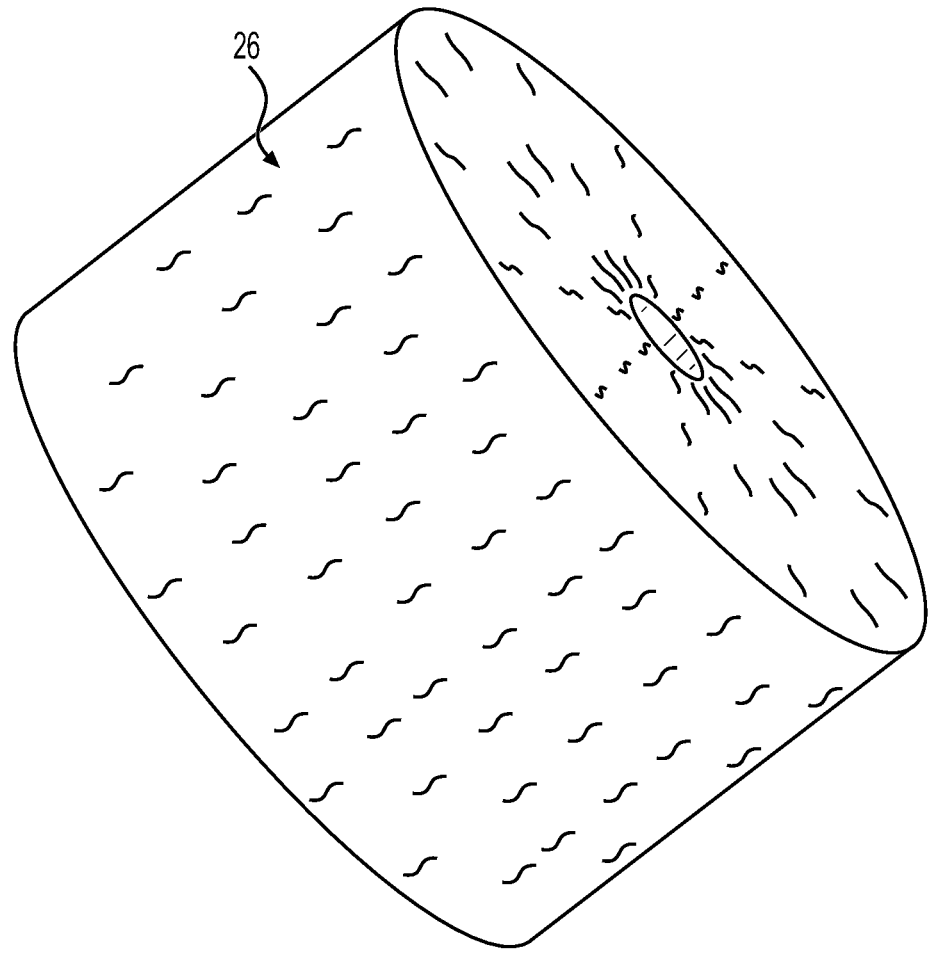
FIG. 4 shows at least a first embodiment of the second filter media in the filter device according to the present invention.

The first high flow filter media 28 is positioned adjacent to a second water removal filter media 26. As shown in FIG. 4, the second filter water removal media 26 which is made from long-fiber material is formed as a cylinder 26*a* also with a hollow tubular center 26*b* and positioned adjacent to and concentric with the hollow tubular center of the first high flow filter media 28. The long-fiber material for the second water removal filter media 26 is selected and formed from material designed to filter and capture water particles (i.e., native water) out of the oil, fuel or other fluid passing through the second water removal filter media 26.

In one embodiment of the second water removal filter media 26, it may be formed as a cylindrical element with a hollow tubular center, wherein the oil or fuel flowing from the first high flow filter media 28 contacts and flows through the body of the second water removal filter media 26. The oil or fuel then flows out the body of the second water removal filter media 26 into a hollow space 30 of the body 12 opposite the front face plate adaptor 14. The oil or fluid in the hollow space 30 can then flow into a central outlet cylinder 32 to exit out of the filter device 10. The outlet cylinder 32 is positioned along the longitudinal centerline of the filter device 10 passing through the hollow tubular center 28*b* of the first high flow filter media 28 and the hollow tubular center 26*b* of the second water removal filter media 26 which are positioned concentric to one another.

In at least the first embodiment, referring to FIGS. 1 and 2, a first spacer plate 34 that is incorporated to maintain a separation between the first high flow filter media 28 and the second filter 26. In addition, a second spacer plate 36 may be used to maintain the structural integrity of the second water removal filter media 26 due to it being constructed from long fiber material, which depending on the selection for the long fiber material may or may not be able to remain rigid on its own. However, further depending on the selection of the structure and materials of both the first and second filter media, spacer plates 34,36 may just be hollow spaces between the first high flow filter media 28 and the second water removal filter media 26, and between the second water removal filter media 26 and the hollow space 30.

At the far side of the second water removal filter media 26, a far end of the outlet cylinder 32 opens into the hollow space 30 such that the oil or fuel flows out of the second water removal filter media 26 into the hollow space 30 and into the outlet cylinder 32. The outlet cylinder 32 is positioned within the cylindrical centers of the first and second filter media and connected at its opposite end to the outlet port 20 of the front face plate adaptor 14. The outlet cylinder 32 is formed with perforations 32*a*,32*b* to allow a portion of the oil or fuel passing through the first high flow filter media 28 and the second water removal filter media 26 to flow back with the oil or fuel that is flowing back to the outlet port. The size and dimensions of a first set of the perforations 32*a* along a top portion of the outlet cylinder 32 are selected and formed so as to account for 80% of the fluid flow through the filter device 10. A second set of perforations 32*b* along a bottom portion of the outlet cylinder 32 that are closer to the outlet port 20 on the front face plate adaptor 14. The size and dimensions of the second set of perforations 32*b* are selected and formed so as to account for the remaining 20% of the fluid flow through the filter device 10.

The filter device 10 may be constructed of any suitable material or known manufacturing process, including for example metal formed by cutting, stamping or molding, or plastic formed by injection molding. It is also possible to use "3D-Printed" processes with a variety of materials including metals and/or plastics. It is also possible for the filter to be constructed of a composition of different materials, for example with the exterior constructed of plastic and the interior of metal. In use, the filter device 10 may be threaded onto, or otherwise provided to, an engine or other part of a machine on which it is to be used either directly or indirectly, through the use of the adapter plate. As would be understood by those of skill in the art, it is preferred that the size, shape and configuration of the filter device 10 and threaded portion of the outlet of the filter device 10 is complementary to the engine and thread on which it is used. Another factor to be considered in selecting the materials for the filter device 10 is the recyclability and reusability of the material selected so as to avoid or at least minimize disposal of any of the filter device's components using landfills or potentially toxic reclamation processes.

Figure 5:
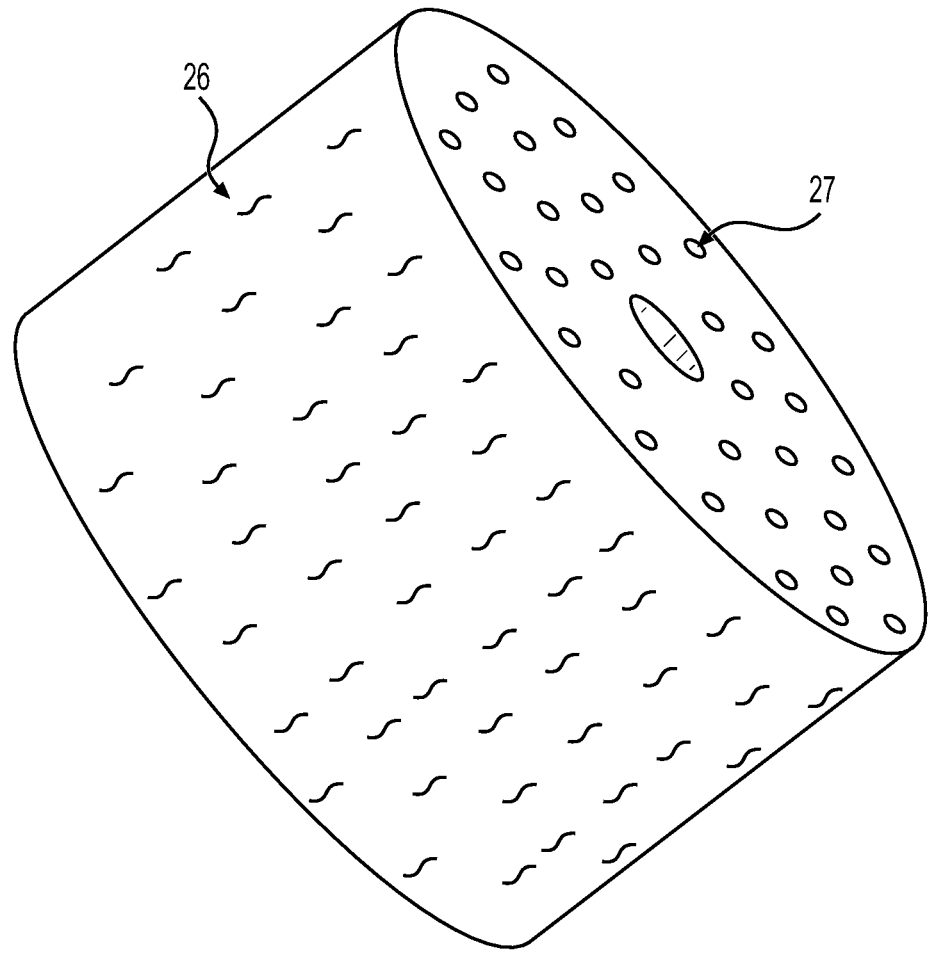
FIG. 5 shows at least a second embodiment of the second filter media in the filter device according to the present invention.

As shown in FIG. 5, an alternative second embodiment of the second water removal filter media 26 may be formed as a cylindrical element with both a hollow tubular center and a plurality of smaller hollow tubes 27 imbedded in the long-fiber material and extending longitudinally in the second water removal filter media 26. The oil or fuel flowing from the first high flow filter media 28 contacts and flows through the second water removal filter media 26. The oil or fuel flows through the body and through the smaller hollow tubes of the second water removal filter media 26 to then flow out to the far side of the second water removal filter media 26 within the body 12 of the filter device 10. Alternatively, the same process may be directed using a folded and rolled design of the filter media in which the hollow tubes are replaced by channels and ridges to achieve increased density and/or surface area in the filter material.

Figure 6:
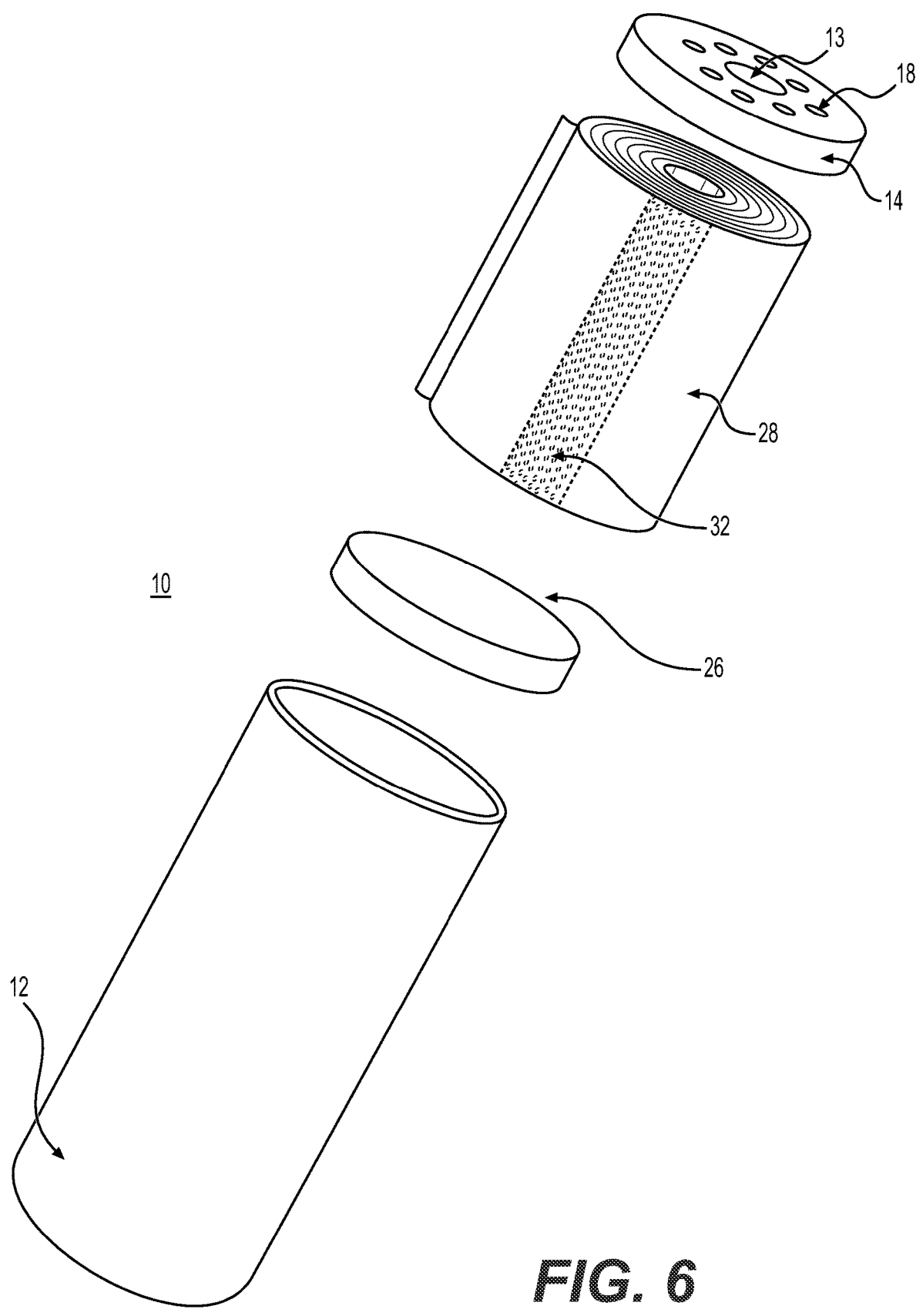
FIG. 6 shows an exploded view of at least a second embodiment of the filter device according to the present invention.

In a second embodiment of the filter device and the first high flow filter media, as shown in FIG. 6 and similar to the first embodiment, the filter device 60 comprises a substantially cylindrical filter bowl or body 62 which acts to encase the internal parts of the filter device 60. The body 62 of the filter device 60 comprises a front face plate adaptor 64 forming a substantially circular cover for the front end of the filter device 60. As in the first embodiment, the front face plate adaptor 64 is formed so as to enable it to connect to an input port for the oil or fuel and to receive an annular seal 66 along an outer periphery of the front face plate adaptor 64. Also, it is preferred that the size, shape and configuration of the front face plate adaptor 64 and seal 66 is such that the filter device 60 is connectable with a conventional filter connection port for either an oil and/or fuel reservoir system.

In addition, the front face plate adaptor 64 comprises an inlet port 68 which includes at least one aperture formed on a peripheral surface 64*a* of the front face plate adaptor 64 that allows the flow of oil or fuel into the body 62 of the filter device 60. The inlet port 68 opens into the peripheral space 62*a* inside the body 62. The front face plate adaptor 64 also incorporates a central outlet port 620 from which the oil or fluid that has passed through the filter device 60 exits and flows back to the engine or oil/fuel reservoir system.

Inside the body 62 of the filter device 60, as in the first embodiment, the first high flow filter media 628 and the second water removal filter media 626 of this second embodiment are positioned immediately adjacent one another such that when the oil or fluid inputted into the filter device 60 via the inlet port 68 flows first into the first high flow filter media 628 and then into the second water removal filter media 626. The first high flow filter media 628 also made from perforated sintered stainless steel or other similar material is formed as a wound or rolled cylinder 628*a* with a hollow tubular center 628*b*. The first high flow filter media 628 is positioned adjacent to a second water removal filter media 626. The wound or rolled construction of the cylinder 628*a* is intended to simplify the manufacturing of the first high flow filter media 628 while maintaining its structural integrity, while potentially increasing the total filtering surface area of the first high flow filter media 628 depending on the dimensions (i.e., thickness) and type of material chosen.

Figure 7:
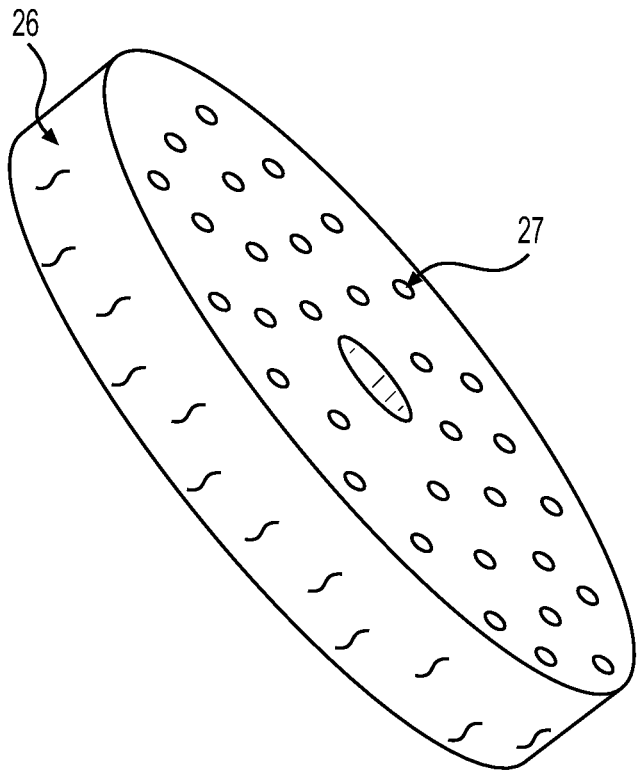
FIG. 7 shows at least a second embodiment of the first filter media in the filter device according to the present invention.

As shown in FIG. 7, the second filter water removal media 626 which is made from long-fiber material is formed as a short or thin cylinder 626*a* also with a hollow tubular center 626*b* and positioned adjacent to and concentric with the hollow tubular center of the first high flow filter media 628. The long-fiber material for the second water removal filter media 626 is selected and formed from material designed to filter and capture water particles (i.e., native water) out of the oil, fuel or other fluid passing through the second water removal filter media 626.

As in the first embodiment, the second water removal filter media 626 may be formed as a cylindrical element with a hollow tubular center, wherein the oil or fuel flowing from the first high flow filter media 628 contacts and flows through the body of the second water removal filter media 626. The oil or fuel then flows out the body of the second water removal filter media 626 into a hollow space 630 of the body 62 opposite the front face plate adaptor 64. The oil or fluid in the hollow space 630 can then flow into a central outlet cylinder 632 to exit out of the filter device 60. The outlet cylinder 632 is positioned along the longitudinal centerline of the filter device 60 passing through the hollow tubular center 628*b* of the first high flow filter media 628 and the hollow tubular center 626*b* of the second water removal filter media 626 which are positioned concentric to one another.

Unlike the second embodiment, referring to FIGS. 6 and 7, hollow spaces between the first high flow filter media 628 and the second water removal filter media 626 are defined therebetween, as well as between the second water removal filter media 626 and the hollow space 630, instead of the first and second spacer plates 34,36 of the first embodiment. Alternatively, spacer plates similar to the first and second spacer plates 34,36 of the first embodiment may be incorporated, such as to maintain the structural integrity of the second water removal filter media 626 due to it being constructed from long fiber material. Further, in this second embodiment, the second water removal filter media 626 may be formed to be thinner (i.e., a lower height longitudinally), which would lower the amount of material used for the second water removal filter and potentially increase its structural integrity, thereby foregoing the need for the second spacer plate to support the second water removal filter media 626.

At the far side of the second water removal filter media 626, a far end of the outlet cylinder 632 opens into the hollow space 630 such that the oil or fuel flows out of the second water removal filter media 626 into the hollow space 630 and into the outlet cylinder 632. The outlet cylinder 632 is positioned within the cylindrical centers of the first and second filter media and connected at its opposite end to the outlet port 620 of the front face plate adaptor 64. The outlet cylinder 632 is formed with perforations 632a,632b to allow a portion of the oil or fuel passing through the first high flow filter media 628 and the second water removal filter media 626 to flow back with the oil or fuel that is flowing back to the outlet port. The size and dimensions of a first set of the perforations 632a along a top portion of the outlet cylinder 632 are selected and formed so as to account for 80% of the fluid flow through the filter device 60. A second set of perforations 632b along a bottom portion of the outlet cylinder 632 that are closer to the outlet port 620 on the front face plate adaptor 64. The size and dimensions of the second set of perforations 632b are selected and formed so as to account for the remaining 20% of the fluid flow through the filter device 60.

As with the first embodiment, the filter device 60 may be constructed of any suitable material including metal or plastic by cutting or injection molding, for example. It is also possible to use "3D-Printed" processes in a variety of materials including metals or plastics. It is also possible for the filter to be constructed of a composition of different materials, for example with the exterior constructed of plastic and the interior of metal. In use, the filter device 60 may be threaded onto, or otherwise provided to, an engine or other part of a machine on which it is to be used either directly or indirectly, through the use of the adapter plate. As would be understood by those of skill in the art, it is preferred that the size, shape and configuration of the filter device 60 and threaded portion of the outlet of the filter device 60 is complementary to the engine and thread on which it is used.

Figure 8:
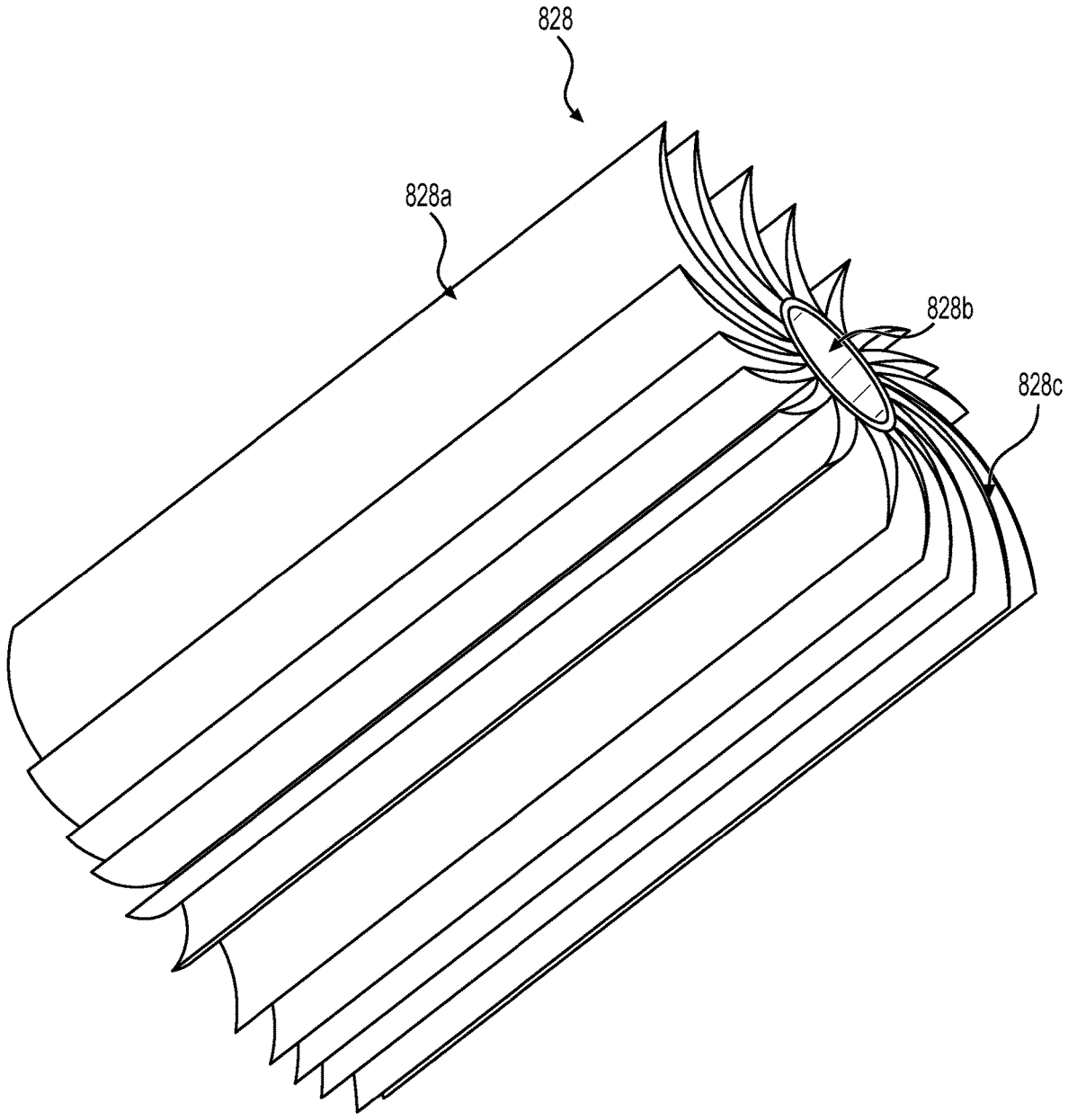
FIG. 8 shows at least a third embodiment of the first filter media in the filter device according to the present invention.

As shown in FIG. 8, in a third embodiment first high flow filter media, the first high flow filter media 828 which is also made from perforated sintered stainless steel or other similar material, is formed as a pleated cylinder 828a with a hollow tubular center 828b, wherein the pleats 828c, in addition to being pleated in a triangular wave-like shape, are curved in an almost arcuate sawtooth wave-like shape. The curvature is intended to achieve the effect of increasing the total surface area of each pleat 828c while using the same size of the body 12 of the filter device 10 as in the first embodiment. Because of the curvature of each of the pleats 828c, a larger total surface area amount of sheet filter material is used in each pleated cylinder 828a, but it has the potential of achieving advantageous effects including a higher level of filtration at the same flow rate as the earlier embodiments. As with the other embodiments of the sheet filter material, the pleating of the sheet filter material may also include sine wave-like, flower petal wave-like, square wave-like and sawtooth wave-like shapes (all not shown), in addition to being arcuately curved.

Figure 9:
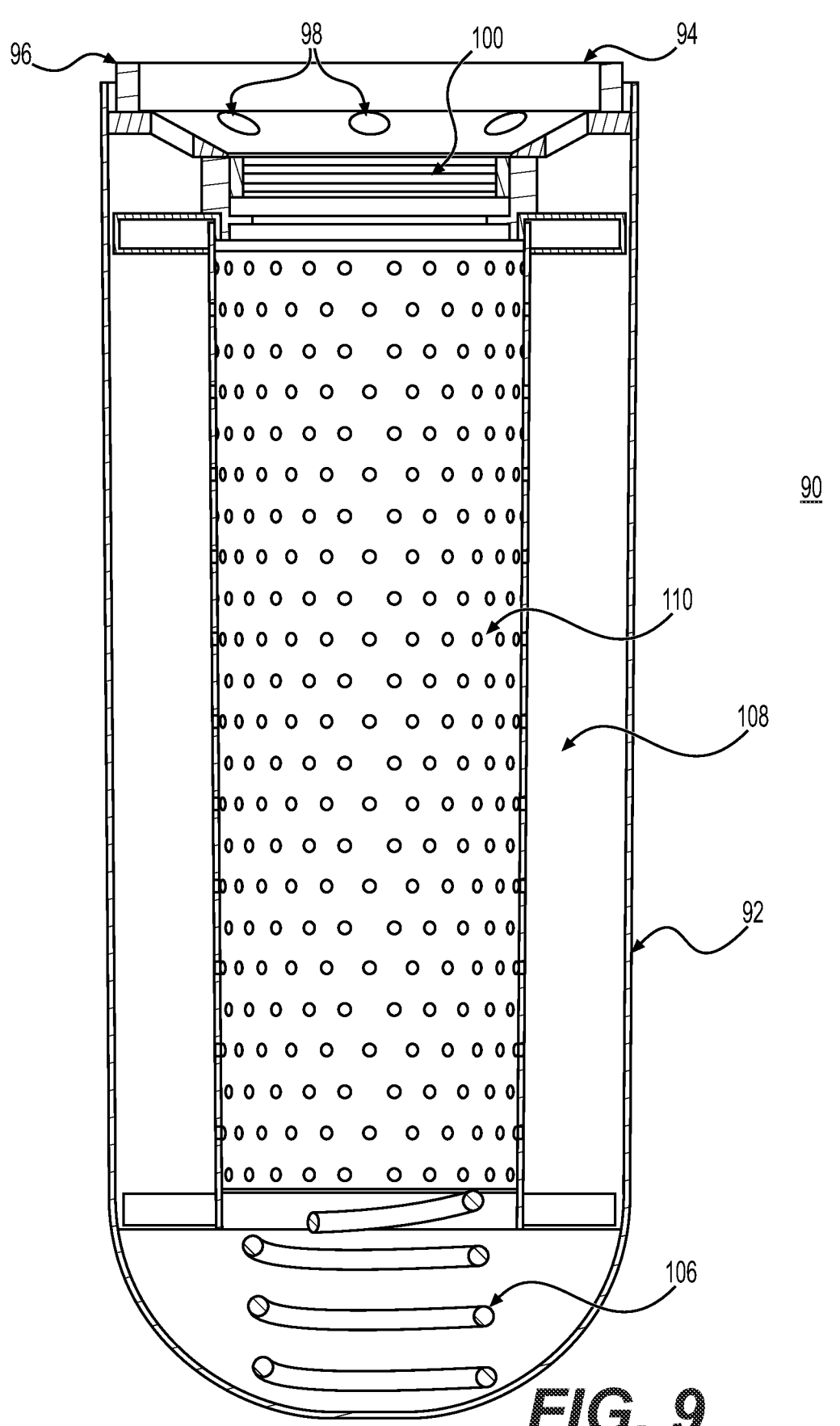
FIG. 9 shows a cross-sectional view of at least a third embodiment of the filter device according to the present invention.
Figure 10:
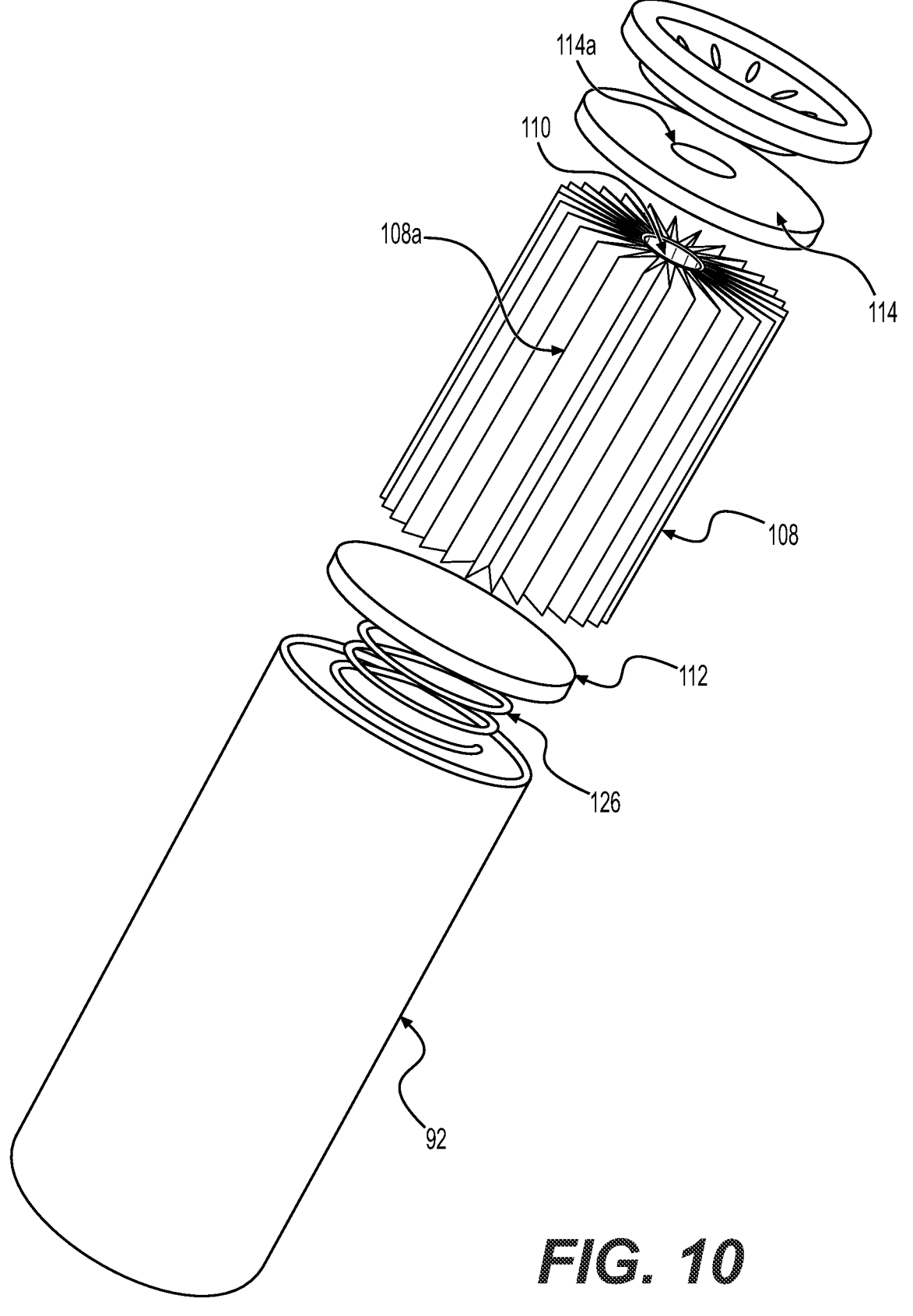
FIG. 10 shows an exploded view of the third embodiment of the filter device according to the present invention.

A third embodiment or implementation of the filter device according to the present invention is shown in FIG. 9 (cross-section view) and FIG. 10 (exploded view). Similar to the other embodiments described hereinabove, the filter device 90 comprises a substantially cylindrical filter bowl or body 92 which acts to encase the internal parts of the filter device 90. The body 92 of the filter device 90 comprises a front face plate adaptor 94 forming a substantially circular cover for the front end of the filter device 90. The front face plate adaptor 94 is formed so as to enable it to connect to an input port for the oil or fuel and to receive an annular seal 96 along an outer periphery of the front face plate adaptor 94. Again it is preferred that the size, shape and configuration of the front face plate adaptor 94 and seal 96 is such that the filter device 90 is connectable with a conventional filter connection port for either an oil, fuel or hydraulic fluid reservoir system.

The front face plate adaptor 94 comprises an inlet port 98 which includes at least one aperture formed on a peripheral surface 94a of the front face plate adaptor 94 that allows the flow of oil, fuel or other fluid into the body 92 of the filter device 90. The inlet port 98 opens into the peripheral space 92a inside the body 92. The front face plate adaptor 94 also incorporates a central outlet port 100 from which the oil, fluid or fluid that has passed through the filter device 90 exits and flows back to the engine, oil/fuel or hydraulic fluid reservoir system.

Inside the body 92 of the filter device 90, a high flow filter media 108 is fixedly positioned within the body 92 with a central spacer spring 106 such that when the oil or fluid inputted into the filter device 90 via the inlet port 98 flows into the high flow filter media 108, it is held in place by the central spacer spring 106 while the oil or fluid flows through the high flow filter media 108 and into a central core tube 110 and out through the outlet port 100. The spacer spring 106 is positioned within the body 92 between the inner wall of the bowl portion 92a of the body 92 and is preferably formed from steel selected to meet the same durability, temperature, mechanical and other performance characteristics as those of the other components in the filter device. In one embodiment, the spacer spring may be formed from stainless steel with mechanical characteristics of a tensile strength of, for example, 110-335 psi$\times 10^3$, modulus of elasticity of 28-20 psi$\times 10^6$ and a minimum tensile design stress of 40-45%, so as to maintain the high flow filter media 108 in a fixed stationary position within the body 92. The spacer spring 106 may also be formed from other materials with the same or similar mechanical characteristics and capable of performing the same function desired from the spacer spring 106. Further, the spacer spring 106 may also be made from other similar materials that meet the same durability, temperature, mechanical and other performance characteristics demanded by the invention all as discussed above.

Figure 11:
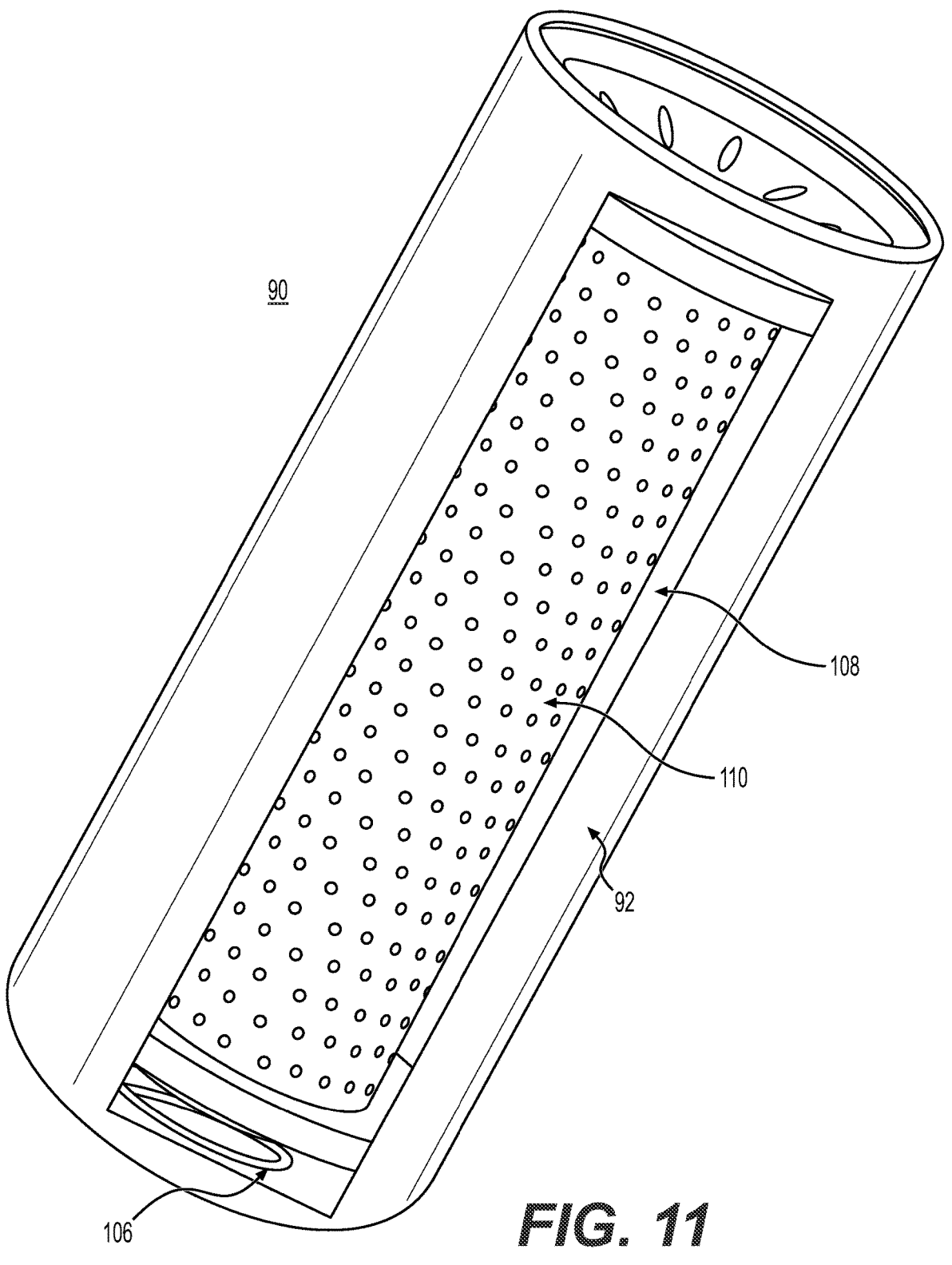
FIG. 11 shows at least a fourth embodiment of the high flow filter media in the filter device according to the present invention.

As shown in FIG. 11, a fourth embodiment of the high flow filter media 108 is made from perforated sintered stainless steel or other similar material is formed as a pleated cylinder 108a with a hollow tubular center 108b. Specifically, in at least one embodiment, the filer media 108 is again formed from sheet filter material made of sintered stainless steel. The sheet filter material is pleated to form the cylinder 108a with the pleated sheet filter material forming an inner wall 108c surrounding the hollow tubular center 108b. In conventional oil filters, for example, it has been found that the typical filter materials are pleated to have panel widths of 0.75 inches. Applicant has found that reducing the pleat depth reduces the tendency for sheet filter material to flex while fluid is flowing through the filter. Such conventional oil filters with deep pleats are prone to a wave action in the pleated filter media that weakens the material of the pleated filter media. To offset the weakening of the pleated filter media, conventional oil filters may use mesh outer layers.

In the present invention, the pleat width may be calculated and determined based on the application and desired characteristics thereof, including the desired flow velocity, flow volume and flow pressure, as well as the desired dimensions of the filter device itself. In a preferred embodiment, the sheet filter material is pleated with a triangular wave-like shape to have 0.375 inch wide panels, which has been determined to be optimal for various applications. However, again depending on the desired performance characteristics and the desired size of the filter device, the sheet filter material may be pleated to have panel widths in the range of 0.375 to 0.75 inches, or even smaller or higher. Also, the sheet filter material may be formed with different shapes of the pleating, as described hereinabove, which may also impact the performance characteristics of the filter device.

A core tube 108*d* is positioned in the hollow tubular center 108*b*, wherein the core tube 110 is a rigid, perforated material lining the hollow tubular center 108*b* adding structural support to the pleated sheet filter material. The core tube 110 is perforated to allow the flow of oil or other fluid from the high flow filter media 108 into the hollow tubular center 108*b*. The core tube 110 preferably is formed from a material that is also capable of durability and high mechanical strength to endure continuous flow pressures of 120 psi or higher; rigid so as to structurally support the high flow filter media 108 but still sufficiently ductile so as to be capable of being shaped into a cylinder; corrosion and high temperature resistance (i.e., 200-260 degrees Fahrenheit or higher); and recyclability and reusability like the high flow filter media 108, such as stainless steel, but may be constructed from other similar materials with similar characteristics. Alternatively, the core tube 110 may be formed as a rigid tubular screen, instead of a perforated tube. Further, the perforations on the core tube 110 may be circular, rectangular, oval or other shapes, and aligned in in various patterns, such as evenly distributed, winding around the surface of the core tube 110 vertically, horizontally or diagonally.

Even more, as with the calculating forming of the pleats in the sheet filter material, the length and diameter of the core tube 110 may be determined to correspond to the pleat width and other dimensions of the sheet filter material. For example, using the dimensions of a conventional oil filter as an example, with an outer diameter in the range of 3.5 inches and higher, and the width of the pleats at 0.375 inches, the core tube 110 could have a diameter around up to 2.75 inches. As compared to conventional diameters of 1.0-2.0 inches, the increase in the diameter may result in achieving higher flow velocity, flow volume and flow pressure.

The top portion of the pleated cylinder 108*a* is fixedly attached to a first end plate 112 that abuts against the spacer spring 106 when the filter media 108 is positioned in place inside the body 92. Preferably, the first end plate 112 is formed from stainless steel, but may be made from other similar materials that meet the same durability, temperature, mechanical and other performance characteristics demanded by the invention all as discussed above.

Further, the bottom portion of the pleated cylinder 108*a* is fixedly attached to a second end plate 114 having a center hole 114*a* that aligns with and connects to the front face plate adaptor 94 such that core tube 110 through the second end plate 114 connects to the central outlet port 100 so that the oil or fluid passing through the filter media 108 can flow into the core tube 110 and exit out the central outlet port 100 back to the engine, oil/fuel or hydraulic fluid reservoir system. Similarly, the second end plate 114 is formed from stainless steel, but also may be made from other similar materials that meet the same durability, temperature, mechanical and other performance characteristics demanded by the invention all as discussed above.

In at least one embodiment, the pleated cylinder 108*a* may be fixedly adhered to the first and second end plates 112,114 via a sealant material 116, such as epoxies, acrylics, acrylates or other similar adhesive substance or composition that permanently affixes the pleated cylinder 108 to the first and second end plates 112,114, while meeting the same durability, temperature, mechanical and other performance characteristics demanded by the invention all as discussed above.

Figure 12:
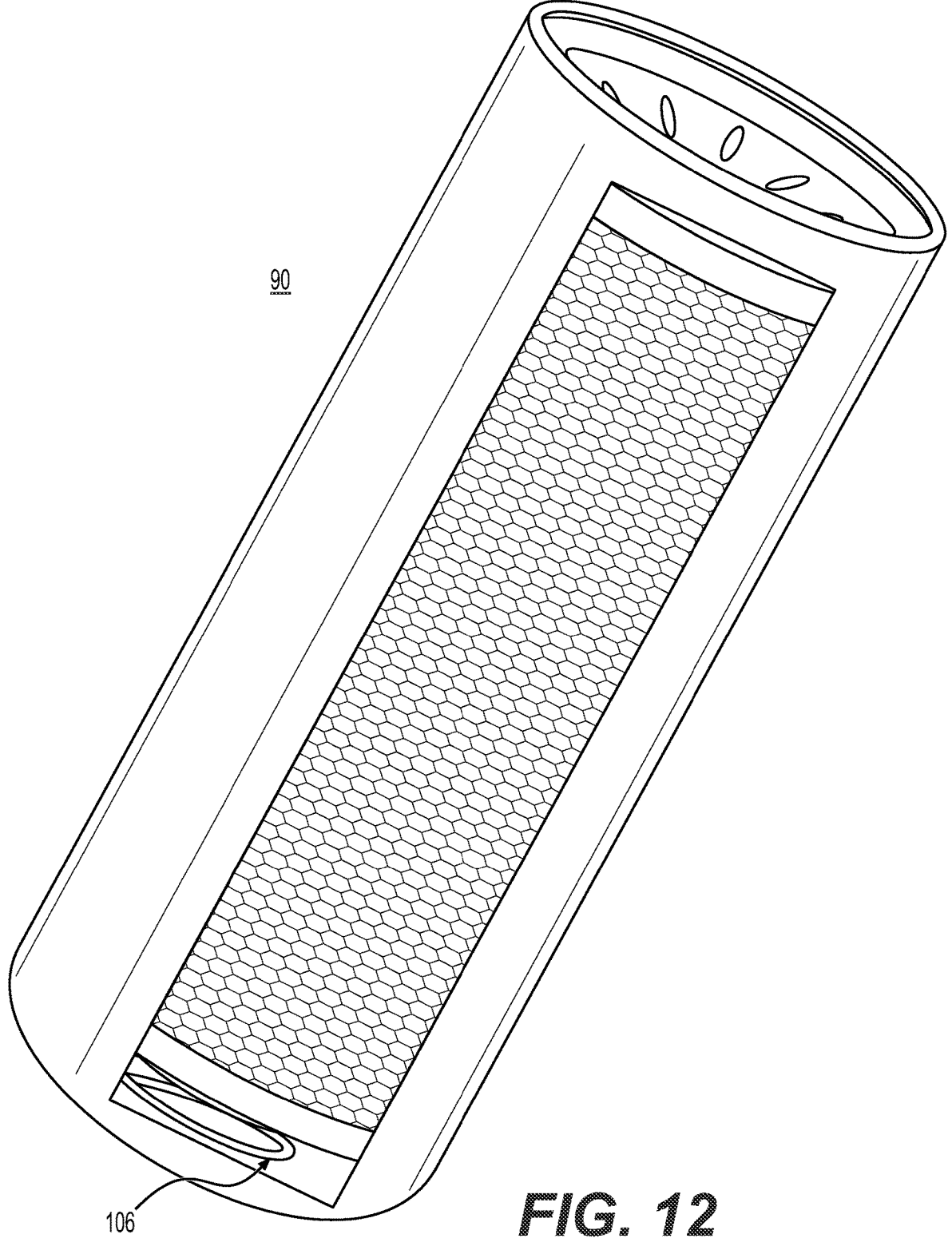
FIG. 12 shows a first variation of the filter device according to the fourth embodiment of the filter media of the present invention.

FIG. 12 shows a first variation of the filter device according to the fourth embodiment of the present invention, wherein in the high flow filter media 108, the pleated cylinder 108*a* is surrounded along its outer periphery by an outer screen 120 made from perforated stainless steel or other similar material. As in the prior embodiments, the high flow filter media 108 according to this first variation is formed with the pleated cylinder 108*a* having the hollow tubular center 108*b* with the core tube 110 perforated to allow the flow of oil or other fluid from the high flow filter media 108 into the hollow tubular center 108*b*. The outer screen 120 preferably is formed from material that is also capable of durability and high mechanical strength to endure continuous flow pressures of 120 psi or higher; rigid so as to structurally support the high flow filter media 108 but still sufficiently ductile so as to be capable of being shaped into a cylinder; corrosion and high temperature resistance (i.e., 200-260 degrees Fahrenheit or higher); and recyclability and reusability like the high flow filter media 108, such as stainless steel, but may be constructed from other similar materials with similar characteristics. The outer screen 120 may be perforated to allow fluid flow therethrough using mesh screen patterns known in the art (i.e., hexagonal gaps, diamond-shaped gaps, square gaps). Alternatively, the outer screen 120 may be formed as a perforated tube, wherein the perforations may be circular, rectangular, oval or other shapes, and aligned in various patterns, such as evenly distributed, winding around the surface of the outer screen 120 vertically, horizontally or diagonally.

Figure 13:
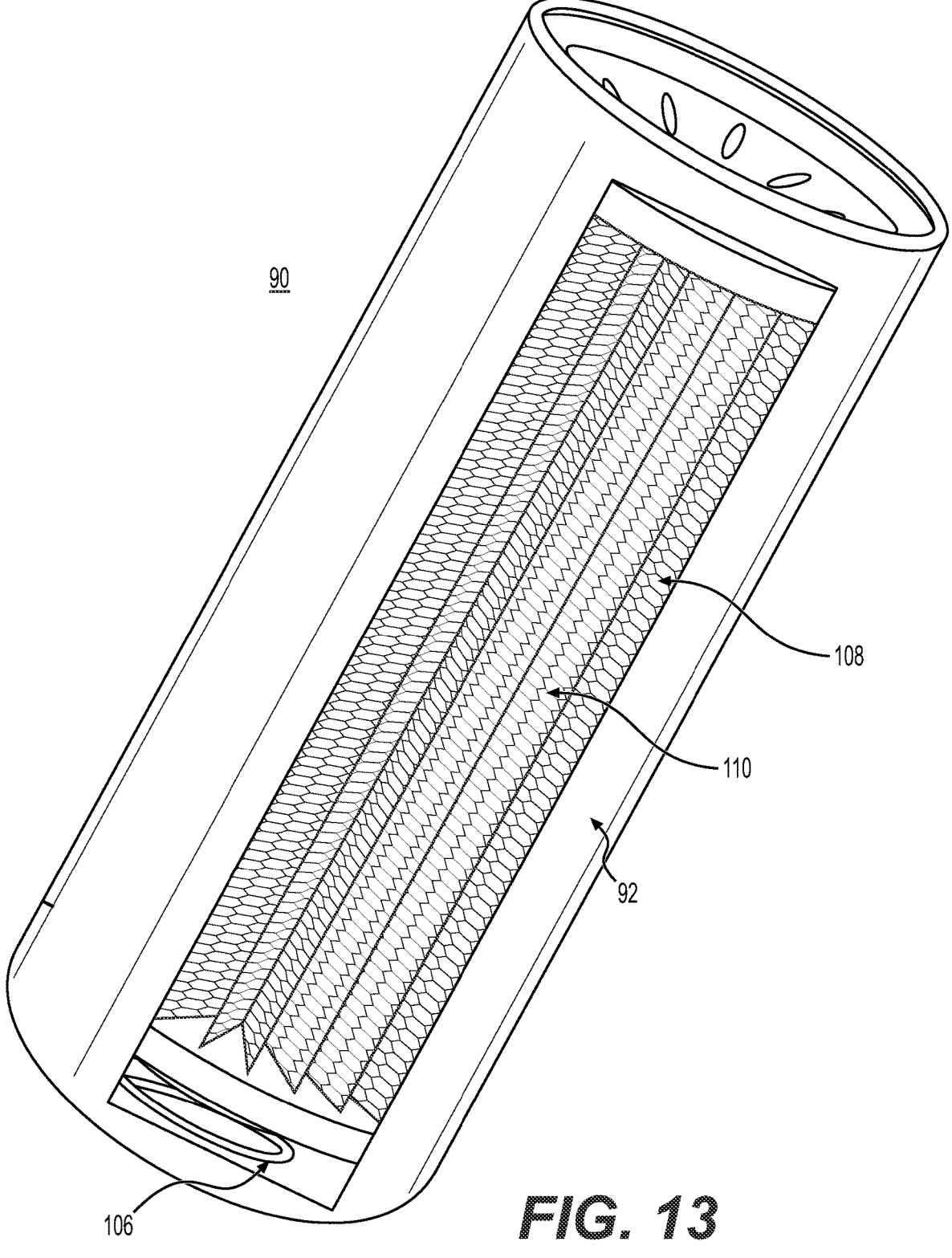
FIG. 13 shows a second variation of the filter device according to the fourth embodiment of the filter media of the present invention.

FIG. 13 shows a second variation of the filter device according to the fourth embodiment of the present invention, wherein in the high flow filter media 108, the pleated cylinder 108*a* is surrounded along its outer periphery by a pleated outer screen 130 made from perforated stainless steel or other similar material. As in the prior embodiments, the high flow filter media 108 according to this first variation is formed with the pleated cylinder 108*a* having the hollow tubular center 108*b* with the core tube 110 perforated to allow the flow of oil or other fluid from the high flow filter media 108 into the hollow tubular center 108*b*. The pleated outer screen 130 is formed with the same or similar pleating as the pleated cylinder 108*a* such the individual folds 108*a*' of the pleated cylinder 108*a* align with and are fitted in corresponding folds 130' of the pleated outer screen 130. Further, the pleated outer screen 130 preferably is also formed from material that is also capable of durability and high mechanical strength to endure continuous flow pressures of 120 psi or higher; rigid so as to structurally support the high flow filter media 108 but still sufficiently ductile so as to be capable of being shaped into a cylinder; corrosion and high temperature resistance (i.e., 200-260 degrees Fahrenheit or higher); and recyclability and reusability like the high flow filter media 108, such as stainless steel, but may be constructed from other similar materials with similar characteristics. The pleated outer screen 130 may be perforated to allow fluid flow therethrough using mesh screen patterns known in the art (i.e., hexagonal gaps, diamond-shaped gaps, square gaps). Alternatively, the pleated outer screen 130 may be formed as a pleated perforated tube, wherein the perforations may be circular, rectangular, oval or other shapes, and aligned in various patterns, such as evenly distributed, winding around the surface of the pleated outer screen 130 vertically, horizontally or diagonally.

The operation of the filtering process implemented by the filter device of the present invention, with reference to FIGS. 1 and 2 as an example, is described as follows:

a. Oil or other fluid enters the filter device 10 through the inlet ports 18 formed on the front face plate adaptor 14 of the filter device 10 as would normally occur in a conventional filter for the particular engine where it is installed;

b. The oil or fluid flows upwards first through the second water removal filter media 26 and then through the first high flow filter media 28, and then filling up the hollow space 30 of the body 12 of the filter device 10 before being outputted through the outlet cylinder 32;

c. Fluid pressure forces the inputted oil or fluid to fill the filter device 10 and to pass through the first high flow filter media 28 in an upward and inward radial direction through the pleats (see FIG. 3) created in the first high flow filter media 28 prior to assembly. The first high flow filter media 28 has a lower resistance value to flow. At this stage, the largest particles and also smallest particles (based on the particular rating for which the stainless steel first high flow filter media 28 is designed) are removed and remain in the first high flow filter media 28. For illustrative purposes only, the engine to which this embodiment of the present invention is applied requires a minimum flow rate of 80% of the flow in order to maintain adequate lubrication;

d. The same fluid pressure also forces the oil or fluid to flow into the second long-fiber second water removal filter media 26 located adjacent to the stainless steel first high flow filter media 28 and further inside the external cover/container. As illustrated in FIGS. 4 and 5, the second water removal filter media 26 is formed in variable rolled and pleated layers based on smaller flow tubes or channels fabricated from the same material that permit 20% of the oil or other to flow through;

e. The oil or fluid flows through both filter media into a volume or hollow space 30 at the far end of the cover/container body 12 which is open to the outlet cylinder 32, which is a central return tube or passageway, to then flow out through the outlet port 13 at the front face plate adaptor 14. Perforations in the central outlet cylinder 32 equaling 80% in the top half and with smaller perforations located at the bottom of the tube closest to the outlet port 13 to the engine. These smaller perforations at the bottom provide 20% of the flow rate; the determination of how this minimum proportion is determined and controlled is based on the formula for designing the outlet port 13; and f. The two flow rates are joined in the central outlet cylinder 32 through the use of a "Venturi" design such that the increased pressure at a higher flow rate draws the 20% flow back in and mixes as the oil or fluid returns to the engine's oil sump. While the total time to filter the entire volume/capacity of the oil sump will vary by engine type and volume of oil, typically and for the illustration/example submitted here the time will be about 10 minutes of continuous operation.

The operation of the filtering process implemented by the filter device of the present invention, with reference to FIGS. 9 and 10 as an example, is described as follows:

a. Oil or other fluid enters the filter device 90 through the apertures of the inlet port 98 formed on the front face plate adaptor 94 of the filter device 90 as would normally occur in a conventional filter for the particular engine where it is installed;

b. The oil or fluid flows upwards through the wall surfaces of the high flow filter media 108, and then filling up the hollow tubular center 108*b* before being outputted through the outlet port 100;

c. Fluid pressure forces the inputted oil or fluid to fill the filter device 90 and to pass through the high flow filter media 108 in an upward and inward radial direction through the pleats (see FIG. 11) created in the high flow filter media 108 prior to assembly. At this stage, the largest particles and also smallest particles (based on the particular rating for which the sintered stainless steel high flow filter media 108 is designed) are removed and remain in the high flow filter media 108. For illustrative purposes only, the engine to which this embodiment of the present invention is applied requires a minimum flow rate of 80% of the flow in order to maintain adequate lubrication. However, other types of motors, engines and other machinery requiring the flow of lubricants, coolants or other fluids to which the present invention would be applicable may be designed to require different flow rates to maintain operation; and d. The oil or fluid flows through high flow filter media 108 into the hollow tubular center 108*b* toward the outlet port 100 at the front face plate adaptor 94.

Tests on the use of the combination of the various embodiments of the filer device according to the present invention as described above have shown that the oil maintenance interval can be extended 6-8 times or more as done with current filter designs.

The present invention can provide advantages over existing filtration methods and devices including: significant reduction in the cost of repairs and maintenance on engines and hydraulic pumps; reduction in the cost of oil, filters and labor to service engines; assured optimum engine performance, availability and extended lubricated component service life; significant reduction in cost and volume of waste oil disposal, and carbon foot print with a direct correlation between improved fuel economy and improved standard of emissions; and maintenance of performance and significantly extended service of fuel pumps and injectors.

Other embodiments of the filter device are contemplated in accordance with the preferred embodiments of the present invention. For example, while it is preferred that the filter device is used to filter oil or diesel or other fuel for a motor, filtration of other fluids and use on other engines or equipment for filtration purposes are able to be performed with the filter device of the present invention. Further, the location of the first and second filter media is not fixed with respect to their relative positions to each other and within the filter device and may be adjusted along with the amount of material to optimize the benefit to the end-user application. As noted above, the sheet filter material may be pleated in different shapes, including but not limited to the triangular wave-like, sine wave-like, flower petal wave-like, square wave-like and sawtooth wave-like shapes (all not shown). Any and all of the embodiments disclosed above may incorporate any and all combinations of the specific features and details discussed above, including but not limited to a cylindrical outer screen, a pleated outer screen, first and second end plates on the pleated cylinder, and the sealant material attaching the first and second end plates to the pleated cylinder. Even more, the design of the front face plate adaptor may be varied to adapt the connecting of the filter device to whatever device is intended to benefit from the filtration. The oil and/or fuel reservoirs on which the filter device may be used include, but are not limited to, engines, oil sumps, dry sump systems, hydraulics and gear boxes. Modifications and variations as would be apparent to those skilled in the art are deemed to be within the scope of the present invention.

I claim:

1. A filter device configured to removably attach to a filter connection port of an engine fluid system, comprising:

a cylindrical body having a first open side and a second closed side;

a front face plate fixedly and non-removably mounted on the first open side, the front face plate having an inlet port and a central outlet port, the front face plate being configured to directly and removably connect to the filter connection port of an engine fluid system;

a filter media formed as a cylinder with an inner tubular passage, the filter media being shaped as a pleated cylinder surrounding the inner tubular passage; and a central outlet tubular passage positioned in and concentric with the inner tubular passage, wherein the filter media is operatively positioned in the cylindrical body such that a fluid inputted into the inlet port will flow through the filter media and then through the central outlet tubular passage to the outlet port, the filter media includes a first end plate fixedly connected to a top end portion of the filter media, and a second end plate fixedly connected to a bottom end portion of the filter media, the second end plate having a hole defined therein that is concentrically aligned with the inner tubular passage of the filter media so as to allow fluid flow from the filter media into the central outlet tubular passage and to the outlet port, and the filter media is formed from sintered stainless steel constructed to allow fluid flow therethrough with a porosity to trap particulates in the range of 8-20 microns, and the filter media is pleated so as to have an effective porosity to trap particulates in the range of 4-20 microns.

2. The filter device according to claim 1, further comprising:

a central spacer spring fixedly mounted inside the cylindrical body and operatively connected between an inner surface of the second closed side and a top end portion of the filter media.

3. The filter device according to claim 1, further comprising:

a central core tube fixedly positioned in the inner tubular passage to support the filter media, the central core tube being formed as a perforated cylinder.

4. The filter device according to claim 1, wherein the first and second end plates are fixedly and sealably connected to the top and bottom end portions, respectively, of the filter media via a sealant material.

5. A filter device: configured to removably attach to a filter connection port of an engine fluid system, comprising:

a cylindrical body having a first open side and a second closed side;

a front face plate fixedly and non-removably mounted on the first open side, the front face plate having an inlet port and a central outlet port, the front face plate being configured to directly and removably connect to the filter connection port of an engine fluid system;

a filter media formed as a cylinder with an inner tubular passage, the filter media being shaped as a pleated cylinder surrounding the inner tubular passage; and a central outlet tubular passage positioned in and concentric with the inner tubular passage, wherein the filter media is operatively positioned in the cylindrical body such that a fluid inputted into the inlet port will flow through the filter media and then through the central outlet tubular passage to the outlet port, the filter media includes a first end plate fixedly connected to a top end portion of the filter media, and a second end plate fixedly connected to a bottom end portion of the filter media, the second end plate having a hole defined therein that is concentrically aligned with the inner tubular passage of the filter media so as to allow fluid flow from the filter media into the central outlet tubular passage and to the outlet port, and the filter media is formed from sintered stainless steel constructed to allow fluid flow therethrough with a porosity to trap particulates in the range of 8-20 microns, and the filter media is pleated so as to have an effective porosity to trap particulates in the range of 4-20 microns; and a cylindrical perforated screen operatively positioned to surround an outer surface of the cylindrical pleated filter media.

6. A filter device: configured to removably attach to a filter connection port of an engine fluid system, comprising:

a cylindrical body having a first open side and a second closed side;

a front face plate fixedly and non-removably mounted on the first open side, the front face plate having an inlet port and a central outlet port, the front face plate being configured to directly and removably connect to the filter connection port of an engine fluid system;

a filter media formed as a cylinder with an inner tubular passage, the filter media being shaped as a pleated cylinder surrounding the inner tubular passage; and a central outlet tubular passage positioned in and concentric with the inner tubular passage, wherein the filter media is operatively positioned in the cylindrical body such that a fluid inputted into the inlet port will flow through the filter media and then through the central outlet tubular passage to the outlet port, the filter media includes a first end plate fixedly connected to a top end portion of the filter media, and a second end plate fixedly connected to a bottom end portion of the filter media, the second end plate having a hole defined therein that is concentrically aligned with the inner tubular passage of the filter media so as to allow fluid flow from the filter media into the central outlet tubular passage and to the outlet port, and the filter media is formed from sintered stainless steel constructed to allow fluid flow therethrough with a porosity to trap particulates in the range of 8-20 microns, and the filter media is pleated so as to have an effective porosity to trap particulates in the range of 4-20 microns; and a pleated perforated screen operatively positioned to alignably surround an outer surface of the cylindrical pleated filter media.

7. The filter device according to claim 1, wherein the filter media is shaped as a pleated cylinder formed with triangular wave-like pleats.

8. The filter device according to claim 1, wherein the central spacer spring is formed from stainless steel.

9. The filter device according to claim 3, wherein the a central core tube is formed from stainless steel.

10. The filter device according to claim 1, wherein the first and second end plates are formed from stainless steel.

11. The filter device according to claim 5, wherein the cylindrical perforated screen is formed from stainless steel.

12. The filter device according to claim 6, wherein the pleated perforated screen is formed from stainless steel.

13. The filter device according to claim 5, further comprising:

a central spacer spring fixedly mounted inside the cylindrical body and operatively connected between an inner surface of the second closed side and a top end portion of the filter media.

14. The filter device according to claim 5, further comprising:

a central core tube fixedly positioned in the inner tubular passage to support the filter media, the central core tube being formed as a perforated cylinder.

15. The filter device according to claim 6, further comprising:

a central spacer spring fixedly mounted inside the cylindrical body and operatively connected between an inner surface of the second closed side and a top end portion of the filter media.

16. The filter device according to claim 6, further comprising:

a central core tube fixedly positioned in the inner tubular passage to support the filter media, the central core tube being formed as a perforated cylinder.

\* \* \* \* \*